(12) United States Patent  
Rissa

(10) Patent No.: US 7,760,948 B1  
(45) Date of Patent: Jul. 20, 2010

(54) PARALLEL COEFFICIENT BIT MODELING

(75) Inventor: Tero Rissa, London (GB)

(73) Assignee: XILINX, Inc., San Jose, CA (US)

( * ) Notice: Subject to any disclaimer, the term of this patent is extended or adjusted under 35 U.S.C. 154(b) by 950 days.

(21) Appl. No.: 11/581,161

(22) Filed: Oct. 13, 2006

(51) Int. Cl.  
*G06K 9/36* (2006.01)

(52) U.S. Cl. ..................................... 382/232

(58) Field of Classification Search ................ 382/232, 382/234, 239–240, 246–250; 341/51, 107; 348/403.1–404.1, 408.1–409.1, 424.2; 375/240.02, 375/240.18–240.2  
See application file for complete search history.

(56) References Cited

U.S. PATENT DOCUMENTS

| | | | | |
|---|---|---|---|---|
| 6,545,618 | B2 * | 4/2003 | Yip | 341/107 |
| 6,944,639 | B2 | 9/2005 | Launiainen | |
| 6,947,874 | B2 * | 9/2005 | Chen | 702/189 |
| 7,333,663 | B1 * | 2/2008 | Schumacher | 382/240 |
| 7,577,300 | B2 * | 8/2009 | Hirao | 382/232 |

OTHER PUBLICATIONS

Pastuszak, Grzegorz, "A High-Perforamnce Architecture for Embedded Block Coding in JPEG 2000", Sep. 2005, vol. 15, No. 9, pp. 1182-1191, available from IEEE, 3 Park Avenue, 17th Floor, New York, NY 10016-5997.

Gangadhar, Manjunath et al., "FPGA bsed EBCOT Architecture for JPEG 2000", pp. 228-233, available from Center for Integrated Circuits and Systems, Dept. of Electrical Engineering, University of Texas at Dallas, TX 75083.

Rabbani Majid et al., "An overview of the JPEG 2000 still image compression standard", Signal Procesing : Image Communication 17, 2002, pp. 3-48, available from Reed Elsevier, Elsevier Science, 125 Park Avenue, 23rd Floor, New York, NY 10017.

Fang, Hung-Chi et al, "Parallel Embedded Block Coding Architecture for JPEG 2000", IEEE Transactions on Circuits and Systems for Video Technology, Sep. 2005, pp. 1086-1097, vol. 15, No. 9; available from IEEE, 3 Park Avenue, 17th Floor, New York, NY 10016-5997.

Andra, Kishore et al., "A High-Performance JPEG2000 Architecture", IEEE Transactions on Circuits and Systems for Video Technology, Mar. 2003 pp. 209-218, vol. 13, No. 3, available from IEEE, 3 Park Avenue, 17th Floor, New York, NY 10016-5997.

International Telecommunication Union, "Information Technology—JPEG 2000 image coding system: Core coding system", Telecommunication Standardization Sector of ITU, SeriesT: Terminals for Telematic Services, Aug. 2002, pp. 1-195, available from International Telecommunication Union (ITU), Place des Nations, 1211 Geneva 20, Switzerland.

* cited by examiner

*Primary Examiner*—Jose L Couso  
(74) *Attorney, Agent, or Firm*—LeRoy D. Maunu

(57) ABSTRACT

A coefficient labeling circuit arrangement for bitplane coding passes in embedded block coding. In one embodiment, a significance lookahead circuit generates lookahead significance states of coefficients in past, current, and future magnitude stripe slices of a code-block containing a plurality of coefficients. A plurality of context labeling circuits are coupled in parallel to the significance lookahead circuit. Each context labeling circuit is configured with a respective significance propagation pass circuit, a respective magnitude refinement pass circuit, and a respective cleanup pass circuit. Context labels are generated in parallel for all bits of the current magnitude stripe slice.

20 Claims, 6 Drawing Sheets

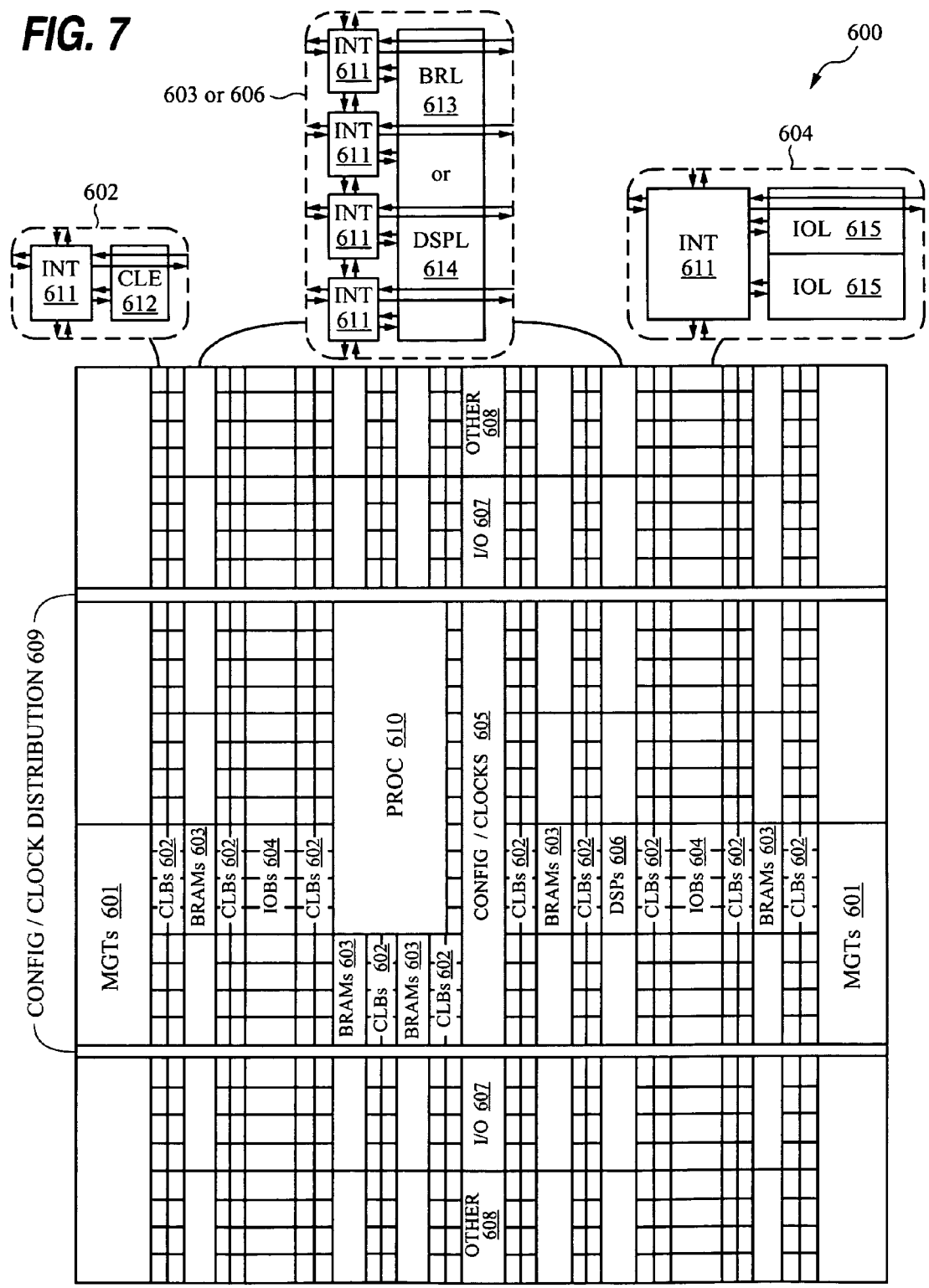

PARALLEL COEFFICIENT BIT MODELING

FIELD OF THE INVENTION

The present invention generally relates to data compression and encoding.

BACKGROUND

The Joint Photographic Experts Group (JPEG) published a standard for compressing image data which became commonly known as the "JPEG standard." The JPEG standard is based on a discrete cosine transform (DCT) compression algorithm that uses Huffman encoding. The compression is limited to 8 bits/pixel. In an effort to provide better compression quality for a broader range of applications, the JPEG developed the "JPEG 2000 standard" (International Telecommunications Union (ITU) Recommendation T.800, August 2002). The JPEG 2000 standard is based on discrete wavelet transform (DWT) and adaptive binary arithmetic coding compression.

The JPEG 2000 standard generally sets forth the following approach. Input image data is partitioned into rectangular, non-overlapping tiles of equal size. The sample values in each tile are level shifted and the color data is decorrelated. A DWT is then applied to these pre-processed image samples. The DWT transform applies a number of filter banks to the pre-processed image samples and generates a set of wavelet coefficients for each tile. The wavelet coefficients are then quantized and thereafter subjected to arithmetic coding. Each subband of coefficients is encoded independently of the other subbands, and a block coding approach is used. Each subband of coefficients is partitioned into a set of rectangular blocks of coefficients called code-blocks. The code-blocks are independently encoded, and the encoded code-blocks are then formatted into a suitable bitstream.

The first part of encoding of the code-blocks is referred to as coefficient bit modeling, and in many cases viewed as the computational bottleneck of JPEG 2000 encoding systems. Two stages of coefficient bit modeling include context labeling and context word encoding. In context labeling, the coefficients in a code-block are processed bitplane by bitplane, commencing with the bitplane having the coefficient with the most significant non-zero bit in the code-block. For each coefficient in the bitplane, a context label is generated in one of three encoding passes, and each context label is used in context word encoding to generate a code that describes the coefficient in that bitplane. A coefficient becomes significant when the first non-zero magnitude bit is encountered. A straightforward implementation of the coefficient bit modeler codes the bitplanes in a bit-serial manner. However, a bit-serial implementation is likely to be very slow and consume hardware clock cycles on the order of $3 \times N^2$, where the code-block is $N \times N$. Parallel architectures may be used to alleviate the large computational requirements of a serial approach but consume a large quantity of chip resources. The present invention may address one or more of the above issues.

SUMMARY OF THE INVENTION

A coefficient labeling circuit arrangement for bitplane coding passes in embedded block coding is provided in one embodiment. The circuit arrangement includes a significance lookahead circuit and a plurality of context labeling circuits coupled in parallel to the significance lookahead circuit. The significance lookahead circuit is configured to generate lookahead significance states of coefficients in past, current, and future magnitude stripe slices of a code-block containing a plurality of coefficients. Each context labeling circuit includes a respective significance propagation pass circuit, a respective magnitude refinement pass circuit, and a respective cleanup pass circuit. Each significance propagation pass circuit is configured to generate in parallel respective significance context labels for coefficients in the current magnitude stripe slice responsive to the lookahead significance states. Each magnitude refinement pass circuit is configured to generate in parallel respective magnitude context labels for coefficients in the current magnitude stripe slice responsive to the lookahead significance states. Each cleanup pass circuit is configured to generate in parallel respective significance context labels for coefficients in the current magnitude stripe slice responsive to the lookahead significance states. The respective significance propagation pass circuit, respective magnitude refinement pass circuit, and respective cleanup pass circuit operate in parallel.

In another embodiment, a method is provided for coefficient labeling for bitplane coding passes in embedded block coding. The method includes generating lookahead significance states of coefficients in past, current, and future magnitude stripe slices of a code-block containing a plurality of coefficients. Respective significance context labels for coefficients in the current magnitude stripe slice are generated in parallel within a significance propagation pass, responsive to the lookahead significance states. Respective magnitude context labels for coefficients in the current magnitude stripe slice are generated in parallel within a magnitude refinement pass, responsive to the lookahead significance states. Respective significance context labels for coefficients in the current magnitude stripe slice are generated in parallel within a cleanup pass, responsive to the lookahead significance states. The generating of context labels by the significance propagation pass, magnitude refinement pass, and cleanup pass are performed in parallel.

In another embodiment, an apparatus is provided for coefficient labeling for bitplane coding passes in embedded block coding. The apparatus includes means for generating lookahead significance states of coefficients in past, current, and future magnitude stripe slices of a code-block containing a plurality of coefficients; means for generating in parallel within a significance propagation pass, respective significance context labels for coefficients in the current magnitude stripe slice responsive to the lookahead significance states; means for generating in parallel within a magnitude refinement pass, respective magnitude context labels for coefficients in the current magnitude stripe slice responsive to the lookahead significance states; and means for generating in parallel within a cleanup pass, respective significance context labels for coefficients in the current magnitude stripe slice responsive to the lookahead significance states; where the generating of context labels by the significance propagation pass, magnitude refinement pass, and cleanup pass are performed in parallel.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 7 illustrates a field programmable gate array (FPGA) architecture on which various embodiments of the invention may be implemented.

DETAILED DESCRIPTION

The various embodiments of the invention employ pass-level and bit-level parallelism in coefficient bit modeling. Each of the significance propagation pass, magnitude refinement pass, and cleanup pass of the context labeling are performed in parallel for pass-level parallelism. Each bitplane is processed by stripe, and the bits within a column of the stripe are processed in parallel to provide the bit-level parallelism. The significance lookahead block permits the bit and pass level parallel operation. The embodiments of the invention provide a low complexity hardware architecture that requires only N×N/4, cycles, which is 1/12th the number of cycles consumed with conventional architectures. Vertically stripe-causal contexts are used in the various embodiments.

Figure 1:
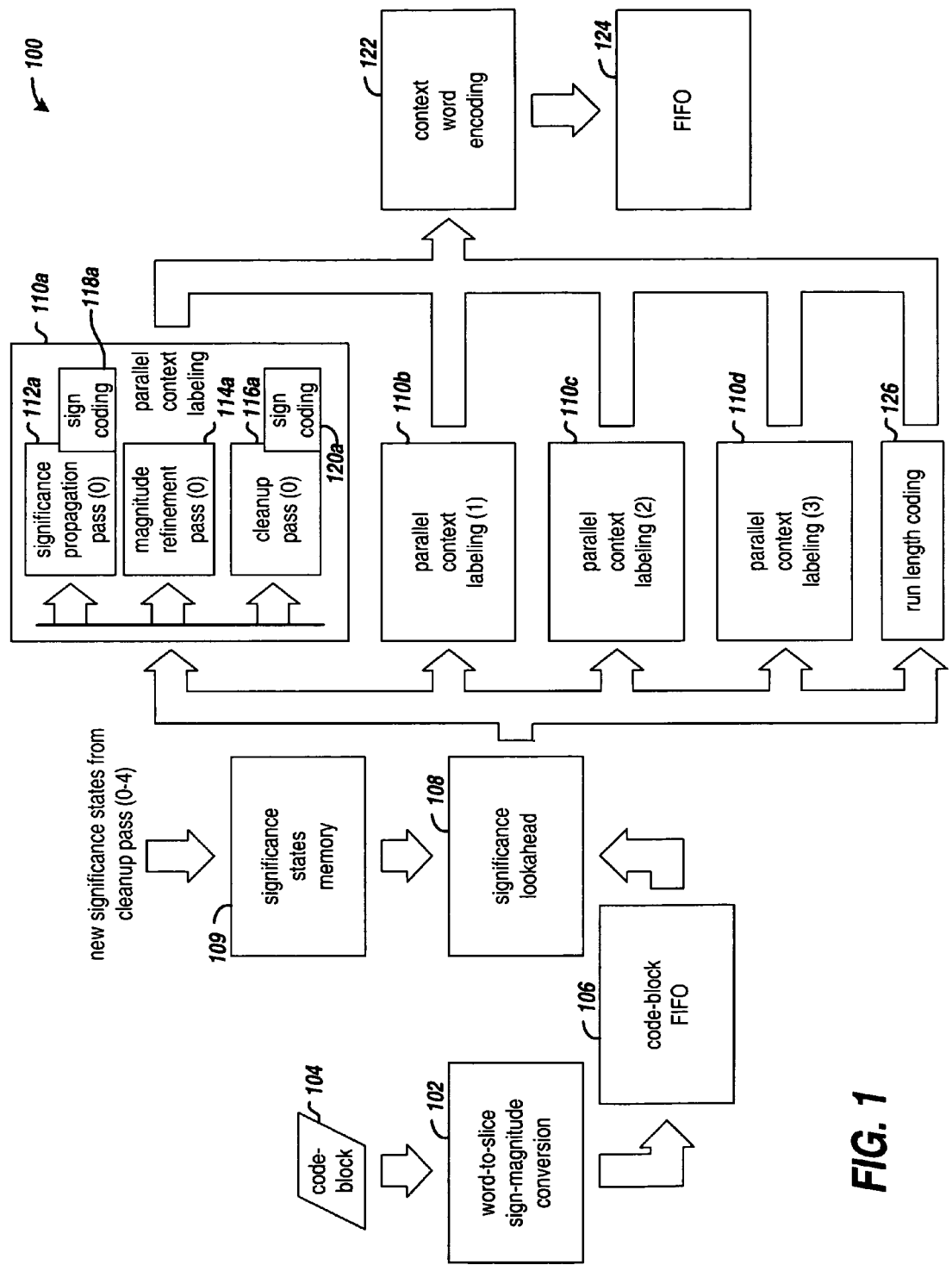
FIG. 1 is a block diagram that illustrates a circuit arrangement for context bit modeling in accordance with one or more embodiments of the invention.

FIG. 1 is a block diagram that illustrates a circuit arrangement 100 for context bit modeling in accordance with one or more embodiments of the invention. The example embodiments are based on the vertical stripe-causal mode as described in the JPEG 2000 standard. For purposes of illustration, this description assumes 11-bit DWT coefficients and 32×32 uniform band code-blocks. It will be appreciated that the architecture may be parameterized to different coefficient and code-block sizes with only a small impact on the hardware logic area or performance. However, the use of wider coefficients or larger code-blocks will impact memory utilization. With practice, it may be found that coding pass boundary termination and initialization options are desirable in the arithmetic entropy encoder in order to keep up with the high data-rate of the coefficient bit modeler.

In the example embodiment, the DWT coefficient words are input to the circuit arrangement in code-block stripe scan order. The word-to-slice sign-magnitude conversion block 102, latches four consecutive coefficients of an input code-block 104 and writes out the striped slice in sign and magnitude format every fourth cycle in 4 and 40 bit words, respectively. Utilization of asymmetric address mapping and data lines at the write and read ports of the code-block FIFO offloads some of the complexity to the hard-wired memory component. Thus, the word-to-slice sign-magnitude conversion block is efficient to implement.

As the word-to-slice sign-magnitude conversion block writes coefficient values to the code-block FIFO, the values are monitored for determining the first bitplane that is not all zeros ("most significant non-zero bitplane"). This may be achieved with a bitwise OR of the four magnitude words and the previous result of this OR. The value is reset at the beginning of each new code-block. At the end of the code-block, the most significant bit of the result of this accumulate OR indicates the most significant non-zero bitplane and is saved for input to the significance lookahead block 108.

The code-block FIFO 106 is sized to accommodate some integer number of code-blocks according to implementation requirements. As the word-to-slice sign magnitude conversion block writes formatted coefficients to the FIFO, the significance lookahead block 108 reads from the FIFO.

The significance lookahead block 108 allows the significance propagation pass, magnitude refinement pass, and cleanup pass to operate in parallel and process all four bits of slice in parallel. A new significance slice is provided by the significance lookahead block for use by the significance propagation pass blocks, magnitude refinement blocks and cleanup pass blocks for parallel context labeling. The inputs from the significance states memory 109 to the significance lookahead block 108 are the significance states of four coefficients of a slice of a stripe in the code-block ("significance stripe slice"), a magnitude slice of the 4 coefficients ("magnitude stripe slice") from the code block FIFO 106, and the significance states of the three coefficients from the stripe above the current stripe in process and aligned with past, current, and future stripe slice of the code block. The stripe "above" the current stripe refers to the previously processed stripe in the same plane. Also, the block has an input that indicates the current subband, LL, HL, LH or HH as defined by the JPEG 2000 standard.

The context labeling by the significance propagation, magnitude refinement, and cleanup passes is performed in parallel for the 4 bits in a slice of a code-block by the parallel context labeling blocks 110a-d, respectively. In the example, labeling block 110a labels bit 0 of the slice, labeling block 110b labels bit 1 of the slice, labeling block 110c bit 2 of the slice, and labeling block 110d labels bit 4 of the slice. Each of the parallel context labeling blocks includes a respective significance propagation pass block 112a, magnitude refinement pass block 114a, and a cleanup pass block 116a. The outputs of each block are the corresponding context label and 1-bit "no context" output that indicates that the coefficient did not have context in that pass, i.e., all neighboring coefficient were insignificant. The significance propagation pass blocks and cleanup pass blocks in the labeling blocks also include respective sign coding blocks 118a and 120a. Each of context labeling blocks 110a-d implements the label generation using simple Boolean equations instead of sum and table lookup method. The new significance states of the processed significance stripe slice are accumulated from the cleanup pass blocks and written to the significance states memory 109. Note that although the example shown in FIG. 1 includes 4 parallel context labeling blocks, fewer or more context labeling blocks may also be used. For instance, two parallel context labeling blocks may be used and equivalent throughput may be achieved by doubling the relevant clocks and making appropriate changes in control logic. Other variations and circuit arrangements will be known to those of ordinary skill in the art.

In parallel with the context labeling blocks 110a-d there is one run-length coding block 126. The inputs to the run length coding block include all significance bits that are in or surround the current slice as they are after significance propagation pass lookahead ($\sigma^{p-sp}$, $\sigma^{c-sp}$, and $\sigma^{f-sp}$ plus the 3 up bits of $\sigma^{p-sp}$, $\sigma^{c-sp}$, and $\sigma^{f-sp}$; "up bits" are explained in the description of FIG. 4) and the significance of the current slice after cleanup pass lookahead ($\sigma^{c-cl}$). The output includes two 2-bit values, Run-length and UNIFORM. The Run-length indicates whether run-length context is used: As an example "10" means run-length context is used and all four contiguous coefficients in the slice remain insignificant; "11" means first run-length context must be coded and then UNIFORM context label(s) must be used for one or more of the coefficients. The UNIFORM value indicates which bit is the first one to be encoded with the UNIFORM label. "00" is first, "01" second etc. A "0x" run-length value means that no run length coding is used. It will be appreciated that other encoding schemes can also be used.

The context word encoding block 122 takes the context label outputs from the parallel labeling blocks 110*a-d* and combines the separate words into a 44-bit context word. The word contains a 2-bit run length field, a 2-bit UNIFORM field, and four 10-bit context words for each parallel coefficient bit. A single 10-bit context word contains a 2-bit "pass identifier", "data" and "sign" bits, 3-bit "sign context identifiers" and 3-bit "data context identifier". The procedure to determine correct context word encoding is as follows: 1) if the coefficient was already significant, magnitude refinement pass context is used; 2) if the coefficient had a context in significance propagation pass, i.e., "no-context" output is inactive, then significance propagation pass context is used associated with the sign context; and 3) if neither of 1) or 2) is satisfied, cleanup pass context is used, again with the sign context. Clean-up pass "no-context" is encoded using a separate identifier in the pass identifier. If there was run-length and possible UNIFORM coding, only cleanup-pass contexts are possible and they are automatically and correctly encoded without additional logic. The encoded context words generated by the context word encoding block are written to FIFO memory 124.

Those skilled in the art will recognize that the logic and storage functions shown in FIG. 1 may be implemented using a combination of one or more electronic system technologies that satisfy design requirements. For example, the combination may include one or more programmable logic devices (PLDs), processors and/or microprocessors, a system-on-a-chip, one or more ASICs, and standalone or integrated memory devices.

Figure 2:
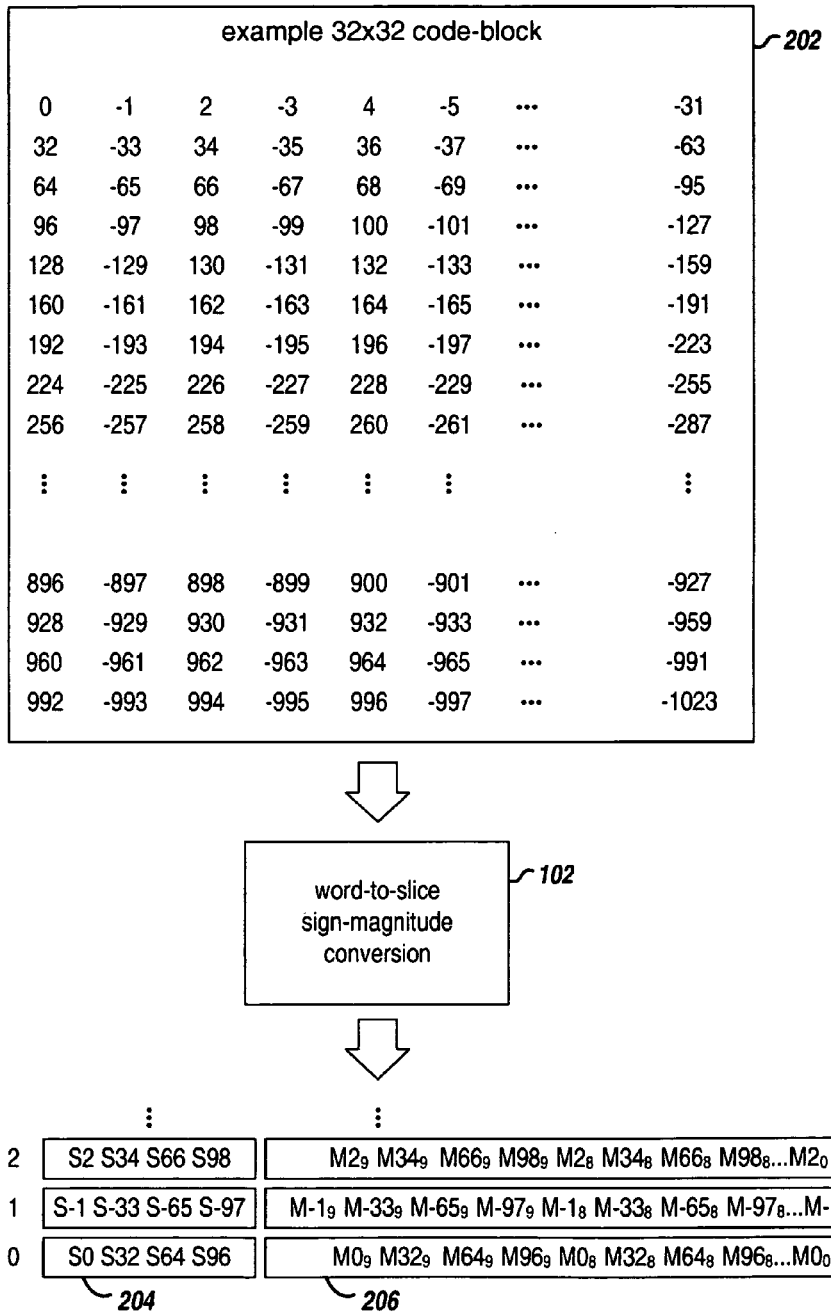
FIG. 2 is a block diagram that illustrates the transformation of an example code-block by a word-to-slice sign-magnitude conversion block.

FIG. 2 is a block diagram that illustrates the transformation of an example code-block 202 by the word-to-slice sign-magnitude conversion block 102. The example code-block is 32×32, and the coefficient values in the block are chosen for ease of illustration and not for any realistic application.

The word-to-slice sign-magnitude conversion block 102 inputs 4 coefficients for processing at once. Relative to the example code-block, the first 4 coefficients values are 0, 32, 64, and 96. After these 4 coefficient values are converted and written to the code-block FIFO 106, the next 4 coefficients values to be converted are −1, −33, −65, and −97 (resulting signs "1111" and magnitudes 1, 33, 65 and 97). When the last column of four coefficient values in the code-block is converted, the input of coefficient values wraps back to the first column of the code-block. For example, after coefficient values −31, −63, −95, and −127 are converted the next 4 coefficient values to be converted are 128, 160, 192, and 224.

For the example code-block, the sign-magnitude conversion block 102, latches four consecutive coefficients and writes out the striped slice in sign and magnitude format every fourth cycle in 4 and 40 bit words, respectively. The first output 4-bit sign word (block 204) contains the sign bits for the coefficient values 0, 32, 64, and 96. The notation in block 204 includes labels that identify the coefficient value from the code-block 202. For example, "S64" refers to the sign bit for the coefficient value 64. The first 40-bit magnitude word (block 206) has the magnitude bits of the coefficient values 0, 32, 64, and 96 arranged in bitplane order from the most significant to the least significant bits. That is, the 4 most significant bits (MSBs) of the 40-bit word are the 4 MSBs of the four coefficient values. The notation in the block 206 indicates the coefficient value from which the magnitude bit is taken and the bitplane of the magnitude bit. For example, $M0_9$ indicates the magnitude bit for the coefficient value 0 in plane 9.

Figure 3:
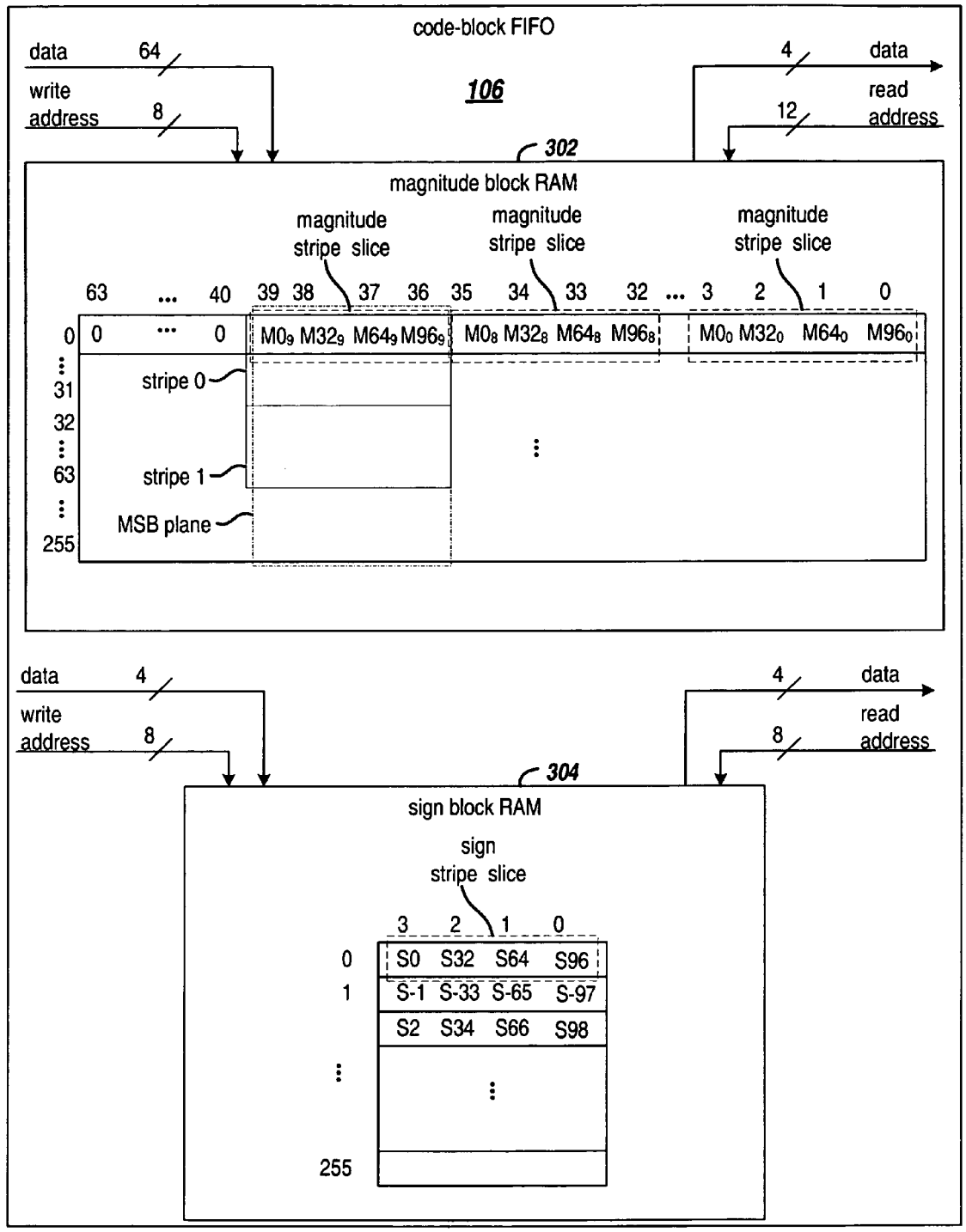
FIG. 3 illustrates the code-block FIFO and the format of the coefficients stored therein by the word-to-slice sign-magnitude conversion block.

FIG. 3 illustrates the code-block FIFO 106 and the format of the coefficients stored therein by the word-to-slice sign-magnitude conversion block 102. The code-block FIFO includes a magnitude block RAM 302 and a sign block RAM 304. The magnitude block RAM stores the magnitude bits for coefficient values in one or more code-blocks, and the sign block RAM stores the corresponding sign bits. It will be appreciated that a block RAM could be implemented to store coefficient values of multiple code-blocks to provide FIFO storage on a code-block-by-code-block basis, even though storage for only one code-block is illustrated.

The example magnitude block RAM is sized to accommodate the magnitude words generated by the word-to-slice sign-magnitude conversion block 102 for the input 32×32 code-block, and each 40-bit magnitude word is padded with 0s to make 64-bit words. The magnitude block RAM is a dual port memory that on the write port is addressed by 8 bits and inputs 64 data bits, and on the read port is addressed by 12 bits and outputs 4 bits. The 8-bit address on the write port addresses each of the 256 magnitude words ((32 word columns*32 word rows*10 bits/coefficient)/(40 bits/mag. word)=256 words, which requires 8 bits) generated by the sign-magnitude conversion block 102, and the 12-bit address on the read port ((32 word columns*32 word rows*10 bits/coefficient)/(4 bits/address)=2560 4-bit slices, which requires 12 bits) addresses each 4-bit "magnitude stripe slice" in a magnitude word. Bits 36..39 in word 0 comprise an example magnitude stripe slice. It will be appreciated that additional address bits would be required to address one of multiple blocks of magnitude words, as the depth of the FIFO is increased.

A stripe in the example includes 32 magnitude stripe slices in the same bitplane, i.e., 128 bits. The MSB plane includes bits 36..39 in words 0..255. Thus, stripe 0 in the MSB plane includes bits 36..39 in words 0..31.

Since the sign for a coefficient value applies to all bitplanes in which that coefficient value is processed, the sign bits in the sign block RAM are not organized by plane. The bits of each 4-bit word in the sign block RAM indicate the sign of each set of 4 coefficient values for which a 40-bit magnitude word was generated. Instead of the actual sign values in the sign block RAM 304, labels are included to refer to the coefficient value in the code block to which the sign bit corresponds. In the example embodiment, a value of '1' indicates a negative coefficient, and a value of '0' indicates a positive coefficient.

From FIG. 1 it will be recalled that the word-to-slice sign-magnitude conversion block 102 identifies the most significant of the bitplane for which the magnitude bits are not all zero. This is the bitplane at which the significance lookahead block 108 and context labeling blocks 110*a-d* commence the context labeling. The significance lookahead block 108 begins processing at the first magnitude stripe slice in the identified bitplane. For example, if bitplane 8 was identified as the most significant bitplane in which the magnitude bits are not all zero, the magnitude stripe slice in bits 32..35 of word 0 are processed first, followed by the magnitude stripe slice in bits 32..35 of word 1, the magnitude stripe slice in bits 32..35 of word 2, etc. When the magnitude stripe slice in bits 32..35 of word 255 have been processed, the significance lookahead and context labeling moves to the next plane, beginning with the magnitude stripe slice in bits 28..31 of word 0.

Figure 4:
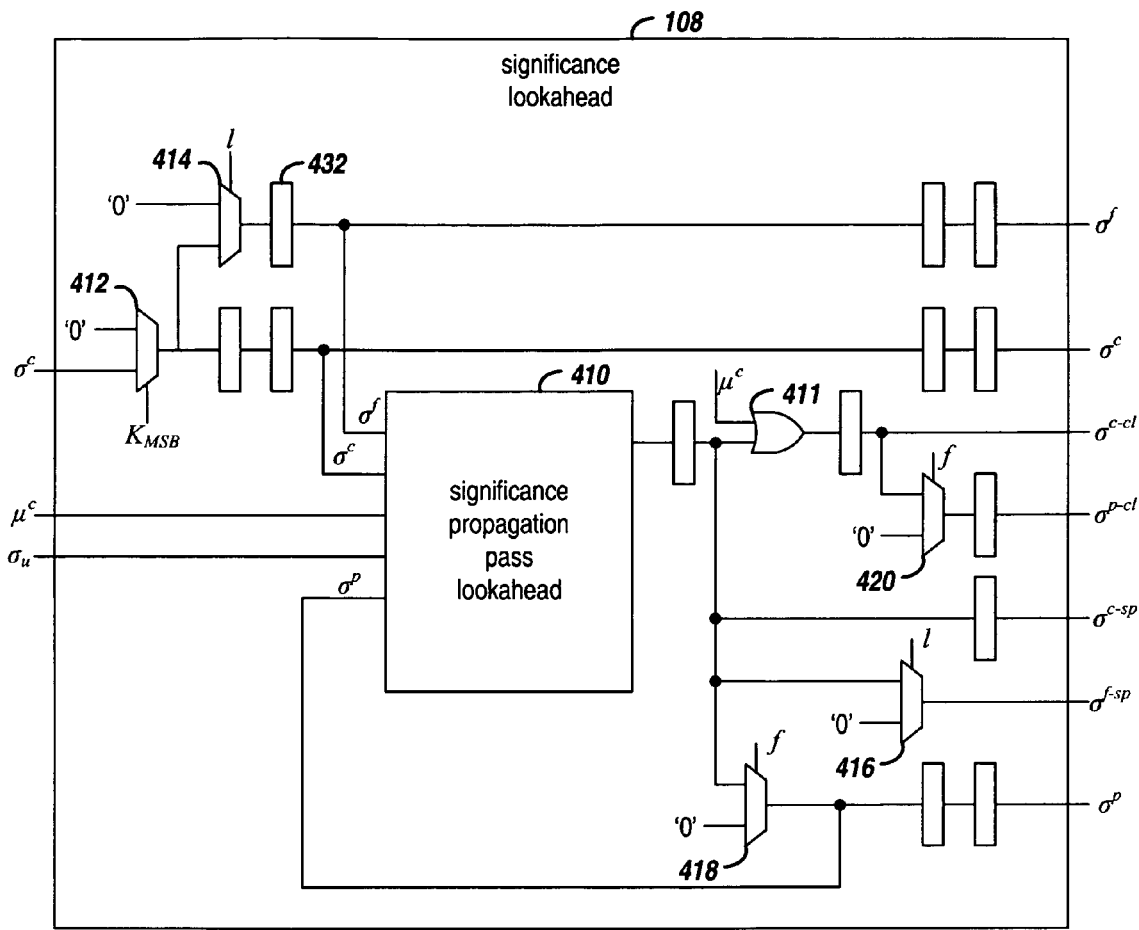
FIG. 4 is a functional block diagram of the significance lookahead block which provides significance state information for parallel operation of the significance propagation pass, magnitude refinement pass, and cleanup pass for context labeling.

FIG. 4 is a functional block diagram of the significance lookahead block which provides significance state information for parallel operation of the significance propagation pass, magnitude refinement pass, and cleanup pass for context labeling. As described in the JPEG 2000 standard, each coefficient in a code-block has an associated significance state that changes during the context labeling. The significance state for a coefficient changes from insignificant to significant when the first non-zero magnitude bit of that coefficient is found (processing from the MSB plane to the LSB plane).

The significance propagation pass lookahead block 410 provides the significance stripe slice, $\sigma^{c\text{-}sp}$, for the current magnitude stripe slice as it would be after the significance propagation pass but before the significance propagation pass is actually computed. The OR-gate 411 performs cleanup-pass lookahead. That is, if the magnitude bit in the magnitude stripe slice is '1', the coefficient will become significant in the cleanup pass.

The notation, $\sigma^d_n$, in FIG. 4 denotes a 4-bit significance slice. The superscript d specifies one of the past, current or future (p, c, f) significance stripe slices relative to the current slice. The subscript n denotes the bit position in the significance stripe slice, with 0 being the "top-most" bit. For example, for the significance stripe slice associated with the coefficients for the magnitude stripe slice in bits 36..39 of word 0 in the magnitude block RAM 302, the top-most bit is the significance state bit associated with the coefficient value 0. The "bottom-most" bit in the example is the significance state bit associated with the coefficient value 96.

With the notation, $\sigma^d_n$, not only may n be designated as one of bits 0-3 (top-most to bottom-most) but n may also equal u. The subscript u is used in combination with the superscripts p, c, and f and denotes the "up bit", that is the bottom-most bit in the significance stripe slice above the denoted one of the past, current, or future significance stripe slices. For example, if the current significance stripe slice, $\sigma^c$, is that associated with the coefficients −129, −161, −193, −225 for the example code block 202, then the past significance stripe slice is that associated with the coefficients 128, 160, 192, and 224, and the future significance stripe slice is that associated with the coefficients 130, 162, 194, and 226. Continuing the example, the significance stripe slice bit denoted by $\sigma^p_u$, refers to the significance state bit associated with the coefficient 96; the significance stripe slice bit denoted by $\sigma^c_u$, refers to the significance state bit associated with the coefficient −97; and the significance stripe slice bit denoted by $\sigma^f_u$, refers to the significance state bit associated with the coefficient 98.

The current magnitude slice is denoted with $\mu^c$.

The current significance stripe slice, $\sigma^c$, is input to mux 412. In response to the current significance stripe slice being the most significant non-zero bit-plane, the selector signal $K_{MSB}$ selects '0', such that the significance is reset and instead of reading the previous significance stripe slice from memory, zero is used.

If the current $\sigma^c$ that is input to mux 412 is the last significance stripe of a slice (for the last magnitude stripe slice in a stripe), mux 414 selects '0' because there is no 'future' significance stripe slice to follow in that stripe. Mux 416 makes a similar selection for output of the future significance stripe slice to the significance propagation pass if the current significance stripe slice is the last for the stripe. Mux 418 selects '0' if the current significance stripe slice is for the first stripe in a slice because there is no previous stripe slice. Mux 420 makes a similar selection for output of the previous significance stripe slice to the cleanup pass if the current significance stripe slice is the first for the stripe. The rectangular blocks, such as block 432, represent latched delays of the significance stripe slice bits.

The significance propagation pass lookahead block 410 implements the following Boolean equations:

$\sigma^{c\text{-}sp}_0 = (\sigma^p_u \text{ OR } \sigma^c_u \text{ OR } \sigma^f_u \text{ OR } \sigma^p_0 \text{ OR } \sigma^f_0 \text{ OR } \sigma^p_1 \text{ OR } \sigma^c_1 \text{ OR } \sigma^f_1) \text{ AND } \mu^c_0 \text{ OR } \sigma^c_0$ $\sigma^{c\text{-}sp}_1 = (\sigma^p_0 \text{ OR } \sigma^{c\text{-}sp}_0 \text{ OR } \sigma^f_0 \text{ OR } \sigma^p_1 \text{ OR } \sigma^f_1 \text{ OR } \sigma^p_2 \text{ OR } \sigma^c_2 \text{ OR } \sigma^f_2) \text{ AND } \mu^c_1 \text{ OR } \sigma^c_1$ $\sigma^{c\text{-}sp}_2 = (\sigma^p_1 \text{ OR } \sigma^{c\text{-}sp}_1 \text{ OR } \sigma^f_1 \text{ OR } \sigma^p_2 \text{ OR } \sigma^f_2 \text{ OR } \sigma^p_3 \text{ OR } \sigma^c_3 \text{ OR } \sigma^f_3) \text{ AND } \mu^c_2 \text{ OR } \sigma^c_2$ $\sigma^{c\text{-}sp}_3 = (\sigma^p_2 \text{ OR } \sigma^{c\text{-}sp}_2 \text{ OR } \sigma^f_2 \text{ OR } \sigma^p_3 \text{ OR } \sigma^f_3) \text{ AND } \mu^c_3 \text{ OR } \sigma^c_3$ The outputs from the significance lookahead block 108 are as follows:

$\sigma^f$ is the future significance stripe slice relative to the current significance stripe slice;

$\sigma^c$ is the current significance stripe slice;

$\sigma^{c\text{-}cl}$ is the resulting lookahead significance stripe slice of the clean-up pass applied to the current stripe slice;

$\sigma^{p\text{-}cl}$ is the resulting lookahead significance stripe slice of the clean-up pass applied to the past stripe slice;

$\sigma^{c\text{-}sp}$ is the resulting lookahead significance stripe slice of the significance propagation pass applied to the current stripe slice;

$\sigma^{f\text{-}sp}$ is the resulting lookahead significance stripe slice of the significance propagation pass applied to the future stripe slice; and $\sigma^p$ is the past significance stripe slice.

Figure 5:
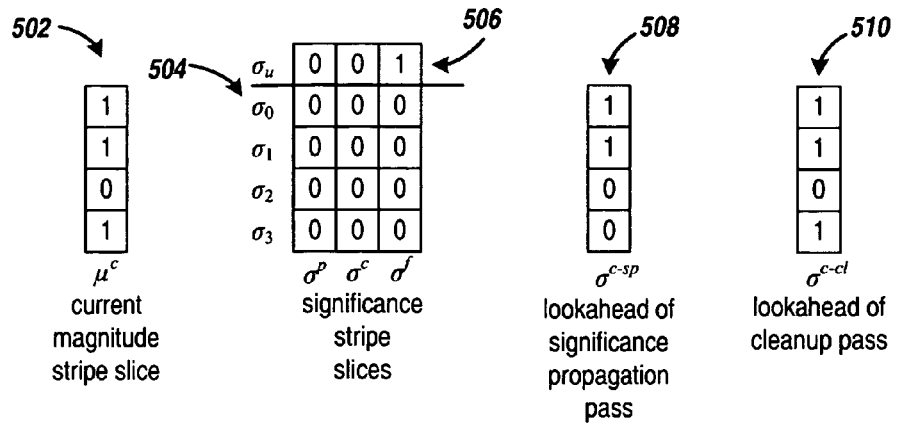
FIG. 5 illustrates example inputs to the significance lookahead block and the resulting significance lookahead stripe slices for the significance propagation pass and cleanup pass.

FIG. 5 illustrates example inputs to the significance lookahead block 108 and the resulting significance stripe slices for lookahead of the significance propagation pass and lookahead of the cleanup pass. The example illustrates the bit-parallel lookahead within the significance propagation pass. The current magnitude stripe slice 502 and the past, current and future significance stripe slices 504 are input to the significance lookahead block 108, along with the up bits 506 for the past, current and future significance stripe slices. The lookahead significance stripe slice 508 indicates what the output of the significance propagation pass will be, and the lookahead significance stripe slice 510 indicates what the output of the cleanup pass will be. The lookahead significance stripe slices allow bit-level parallelism of the significance propagation pass, cleanup pass, and magnitude refinement pass.

The top-most bit of the current significance stripe slice, $\sigma^c_0$, becomes significant in the significance propagation pass because the magnitude bit is '1' ($\mu^c_0$) and a neighbor is significant ($\sigma^f_u$). The corresponding bit in the lookahead for significance propagation pass ($\sigma^{c\text{-}sp}_0$) illustrates that the top-most bit will become significant. Also, $\sigma^{c\text{-}sp}_1$ will become significant because the magnitude bit $\mu^c_1$ is '1' and because $\sigma^{c\text{-}sp}_0$ is now significant. This demonstrates bit-parallel lookahead within the significance propagation pass. The bottom-most significance bit, $\sigma^c_3$, does not have significant neighbors and will not become significant in significance propagation pass, but will become significant in the cleanup pass, as indicated by $\sigma^{c\text{-}cl}_3$ in the lookahead of cleanup pass, because the corresponding magnitude bit $\mu^c_3$ is '1'.

The outputs from the significance lookahead block 108 are mapped to the inputs of the significance propagation pass, magnitude refinement pass, and cleanup pass blocks as set forth in Table 1 below. Though significance propagation pass, magnitude refinement pass, and cleanup pass blocks are shown only specifically for bit 0 and not for bits 1, 2, and 3 in the parallel context labeling blocks 110a-d in FIG. 1, entries in Table 1 specify the inputs for the pass blocks in all of context labeling blocks 110a-d.

The inputs to the pass blocks are labeled $H_0$, $H_1$, $V_0$, $V_1$, $D_0$, $D_1$, $D_2$, $D_3$, according to the JPEG 2000 standard. The pass blocks are labeled in the table as "Sig-Prop" for the significance propagation pass block, "Mag-Ref" for the magnitude refinement pass block, and "Cleanup" for the cleanup pass block. The subscripts on the names of the pass blocks identify the one of parallel context labeling blocks 110a-d to which the pass blocks belong. The entries in the table specify the bits of the significance stripe slices from the significance lookahead block 108 that are input on the named inputs of the pass blocks. For example, $\sigma^p_u$ is the diagonal-0 ($D_0$) input to the significance propagation pass block in parallel context labeling block 110a.

TABLE 1

| Block | $H_0$ | $H_1$ | $V_0$ | $V_1$ | $D_0$ | $D_1$ | $D_2$ | $D_3$ |
|---|---|---|---|---|---|---|---|---|
| Sig-Prop$_0$ | $\sigma^p_0$ | $\sigma^f_0$ | $\sigma^c_u$ | $\sigma^c_1$ | $\sigma^p_u$ | $\sigma^f_u$ | $\sigma^p_1$ | $\sigma^f_1$ |
| Sig-Prop$_1$ | $\sigma^p_1$ | $\sigma^f_1$ | $\sigma^{c-sp}_0$ | $\sigma^c_2$ | $\sigma^p_0$ | $\sigma^f_0$ | $\sigma^p_2$ | $\sigma^f_2$ |
| Sig-Prop$_2$ | $\sigma^p_2$ | $\sigma^f_2$ | $\sigma^{c-sp}_1$ | $\sigma^c_3$ | $\sigma^p_1$ | $\sigma^f_1$ | $\sigma^p_3$ | $\sigma^f_3$ |
| Sig-Prop$_3$ | $\sigma^p_3$ | $\sigma^f_3$ | $\sigma^{c-sp}_2$ | 0 | $\sigma^p_2$ | $\sigma^f_2$ | 0 | 0 |
| Mag-Ref$_0$ | $\sigma^p_0$ | $\sigma^{f-sp}_0$ | $\sigma^c_u$ | $\sigma^{c-sp}_1$ | $\sigma^p_u$ | $\sigma^f_u$ | $\sigma^p_1$ | $\sigma^{f-sp}_1$ |
| Mag-Ref$_1$ | $\sigma^p_1$ | $\sigma^{f-sp}_1$ | $\sigma^{c-sp}_0$ | $\sigma^{c-sp}_2$ | $\sigma^p_0$ | $\sigma^{f-sp}_0$ | $\sigma^p_2$ | $\sigma^{f-sp}_2$ |
| Mag-Ref$_2$ | $\sigma^p_2$ | $\sigma^{f-sp}_2$ | $\sigma^{c-sp}_1$ | $\sigma^{c-sp}_3$ | $\sigma^p_1$ | $\sigma^{f-sp}_1$ | $\sigma^p_3$ | $\sigma^{f-sp}_3$ |
| Mag-Ref$_3$ | $\sigma^p_3$ | $\sigma^{f-sp}_3$ | $\sigma^{c-sp}_2$ | 0 | $\sigma^p_2$ | $\sigma^{f-sp}_2$ | 0 | 0 |
| Cleanup$_0$ | $\sigma^{p-cl}_0$ | $\sigma^{f-sp}_0$ | $\sigma^{c-cl}_u$ | $\sigma^{c-sp}_1$ | $\sigma^{p-cl}_u$ | $\sigma^{f-cl}_u$ | $\sigma^{p-cl}_1$ | $\sigma^{f-sp}_1$ |
| Cleanup$_1$ | $\sigma^{p-cl}_1$ | $\sigma^{f-sp}_1$ | $\sigma^{c-cl}_0$ | $\sigma^{c-sp}_2$ | $\sigma^{p-cl}_0$ | $\sigma^{f-sp}_0$ | $\sigma^{p-cl}_2$ | $\sigma^{f-sp}_2$ |
| Cleanup$_2$ | $\sigma^{p-cl}_2$ | $\sigma^{f-sp}_2$ | $\sigma^{c-cl}_1$ | $\sigma^{c-sp}_3$ | $\sigma^{p-cl}_1$ | $\sigma^{f-sp}_1$ | $\sigma^{p-cl}_3$ | $\sigma^{f-sp}_3$ |
| Cleanup$_3$ | $\sigma^{p-cl}_3$ | $\sigma^{f-sp}_3$ | $\sigma^{c-cl}_2$ | 0 | $\sigma^{p-cl}_2$ | $\sigma^{f-sp}_2$ | 0 | 0 |

When coding the most significant non-zero bitplane, the significance states and refined-once bits are not taken into consideration. In addition, the sign and significance of the bottom-most bit of a significance stripe slice of significance propagation pass and cleanup pass are fed into delay-line for subsequent use as the "up bits" when the corresponding significance stripe slice in the stripe below is processed. These delayed significance bits are $\sigma^p_u$, $\sigma^c_u$, and $\sigma^f_u$ for significance propagation pass and $\sigma^{c-cl}_u$, $\sigma^{p-cl}_u$, and $\sigma^{f-cl}_u$ for cleanup pass.

Figure 6:
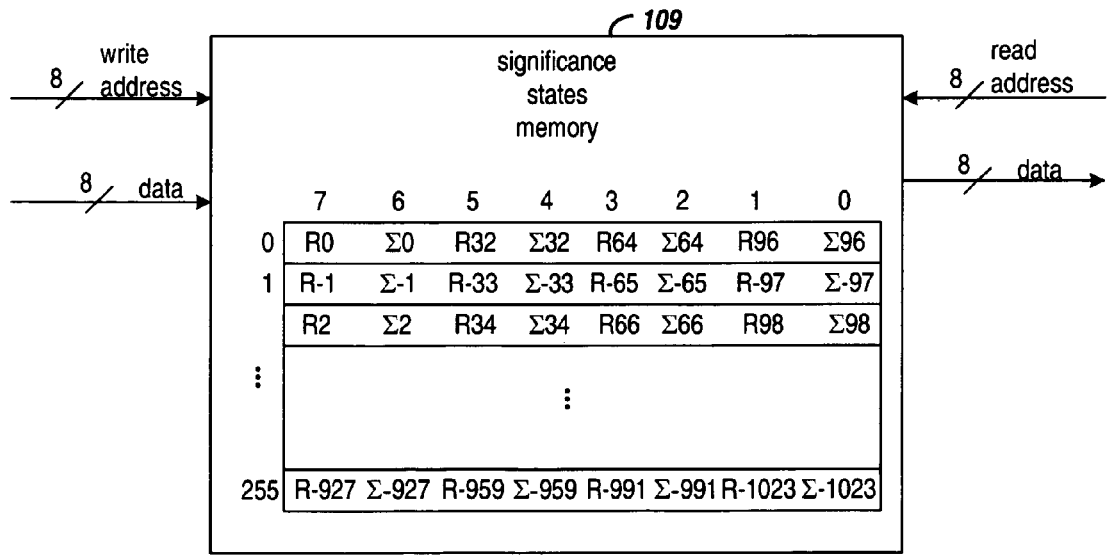
FIG. 6 illustrates an example significance states memory that is used to accumulate the significance states of the coefficients during coefficient bit modeling of a code-block.

FIG. 6 illustrates an example significance states memory 109 that is used to accumulate the significance states of the coefficients during coefficient bit modeling of a code-block. For each coefficient in the code block there is an associated significance state bit along with a bit that indicates whether the coefficient has been refined in the magnitude refinement pass only once ("refined-once bit").

Each 8-bit word of the significance states memory stores the significance states and refined-once bits for the 4 coefficients in a stripe slice. In the example layout of the significance states memory, the significance states are labeled according to the coefficient value from the example code block 202. For example, Σ0 corresponds to the significance state for the coefficient value 0 in the example code-block. The refined-once bits are similarly labeled, for example, R0.

The significance states memory is dual ported, with 8-bit address lines and 8-bit data lines on the ports.

Each of the significance propagation pass, magnitude refinement pass, and cleanup pass blocks, for example, 112a, 114a, and 116a of FIG. 1, implements Boolean equations that form the context labels. Two phases of Boolean equations are implemented based on the inputs described in Table 1. In the first phase, auxiliary terms are formed from the inputs, and in the second phase, the auxiliary terms are combined to form the labels. The context labeling for each of the significance propagation pass, magnitude refinement pass, and cleanup pass blocks is described below.

For the significance propagation pass block, the auxiliary terms are formed as follows:
$D_{or} = D_0$ OR $D_1$ OR $D_2$ OR $D_3$
$D_{and} = D_0$ AND $D_1$ AND $D_2$ AND $D_3$
$H_{or} = H_0$ OR $H_1$
$H_{and} = H_0$ AND $H_1$
$V_{or} = V_0$ OR $V_1$
$V_{and} = V_0$ AND $V_1$
$D_x = D_0$ XOR $D_1$ XOR $D_2$ XOR $D_3$ OR $D_{and}$
$D_\tau = (D_2$ AND $(D_0$ OR $D_1)$) OR $(D_3$ AND $(D_2$ OR $D_0)$) OR $(D_1$ AND $(D_3$ OR $D_0)$)
$HV_\tau = (V_0$ AND $(H_0$ OR $H_1)$) OR $(V_1$ AND $(V_0$ OR $H_0)$) OR $(H_1$ AND $(V_1$ OR $H_0)$)

The significance propagation pass and cleanup pass 3-bit context label identifier, CX, for LL and LH subbands is constructed as follows:
$CX_2 = H_{or}$
$CX_1 = H_{and}$ OR $V_{or}$
$CX_0 = H_{and}$ OR NOT $CX_2$ AND $V_{and}$ OR NOT $CX_1$ AND $(H_{or}$ AND $D_{or}$ OR NOT $CX_2$ AND $D_{96})$ The CX context label identifier for the HL subband may be formed using the same equations as for the LL and LH subbands but with different auxiliary terms formed by exchanging H and V inputs. Thus, the same logic may be used for both the LL and LH and for the HL subbands with muxes used to select between the H and V inputs according to whether the context is LL and LH, or HL. For completeness, the equations for the HL subband are as follows:
$D_{or} = D_0$ OR $D_1$ OR $D_2$ OR $D_3$
$D_{and} = D_0$ AND $D_1$ AND $D_2$ AND $D_3$
$H_{or} = V_0$ OR $V_1$
$H_{and} = V_0$ AND $V_1$
$V_{or} = H_0$ OR $H_1$
$V_{and} = H_0$ AND $H_1$
$D_x = D_0$ XOR $D_1$ XOR $D_2$ XOR $D_3$ OR $D_{and}$
$D_\tau = (D_2$ AND $(D_0$ OR $D_1)$) OR $(D_3$ AND $(D_2$ OR $D_0)$) OR $(D_1$ AND $(D_3$ OR $D_0)$)
$HV_\tau = (H_0$ AND $(V_0$ OR $V_1)$) OR $(H_1$ AND $(H_0$ OR $V_0)$) OR $(V_1$ AND $(H_1$ OR $V_0)$)

The CX content label identifier for the HH subband may be formed using the following equations:
$CX_2 = D_{96}$ OR NOT $(H_{or}$ OR $V_{or})$ AND $D_x$
$CX_1 = D_x$
$CX_0 = ($NOT $D_\tau$ AND $HV_\tau)$ OR $(D_\tau$ AND $(H_{or}$ OR $V_{or})$) OR $(D_\tau$ AND $D_x)$ These equations for the HH subband yield different context labels than those for the other subbands. This does not have an effect on the result of arithmetic coding when the arithmetic encoder is terminated between different subbands, as would be the case when uniform subband code-blocks and coding pass boundary termination are used. When the arithmetic coder is not terminated between subbands, a simple 8×3 ROM may be used to remap the labels. Contents of this ROM are shown in Table 2 below.

TABLE 2

| Address | Data |
|---|---|
| 000 | 000 |
| 001 | 001 |
| 010 | 011 |
| 011 | 100 |
| 100 | 101 |
| 101 | 110 |

TABLE 2-continued

| Address | Data |
|---------|------|
| 110 | 010 |
| 111 | 111 |

The Boolean equations for the magnitude refinement pass use an additional auxiliary input, $F_{ref}$, which is '0' when the coefficient is refined for the first time and '1', when it has been previously been refined. The magnitude refinement context label is 2-bits, with the $CX_2$ bit always '0'.

$ALL_{or} = V_{or}$ OR $H_{or}$ OR $D_{or}$
$CX_1 = F_{ref}$
$CX_0 = $ NOT $F_{ref}$ AND $ALL_{or}$
$CX_{no} = $ NOT $ALL_{or}$ The context label for sign coding uses the sign of the coefficient, $\chi$. The value '1' represents a negative coefficient, and '0' represents a positive coefficient. Bits 0 and 1 one of $H_\chi$ are used for horizontal neighbor signs, and bits 0 and 1 of $V^\chi$ are used for vertical neighbor signs. Vertical sign contribution is denoted as $\chi V$, and horizontal sign contribution is denoted as $\chi H$. Similarly, $\sigma_H$ and $\sigma_V$ are used for significance contribution in sign bit decoding. In addition, a SIGN term is calculated, which determines the state of the output sign bit. The following Boolean equations specify the context label for sign coding:

$\sigma_H = (H_0$ XOR $H_1)$ OR $(H_0$ AND NOT $(H_0^\chi$ XOR $H_1^\chi))$
$\sigma_V = (V_0$ XOR $V_1)$ OR $(V_0$ AND NOT $(V_0^\chi$ XOR $V_1^\chi))$
$\chi_H = (H_0$ OR $H_1)$ AND (NOT $H_0$ OR $H_0^\chi)$ AND (NOT $H_1$ OR $H_1^\chi))$
$\chi_V = (V_0$ OR $V_1)$ AND (NOT $V_0$ OR $V_0^\chi)$ AND (NOT $V_1$ OR $V_1^\chi))$
$CX_2 = \sigma_H$
$CX_1 = \sigma_V$
$CX_0 = \sigma_H$ AND $(\chi_H$ XOR $\chi_V)$
SIGN $= \chi_H$ OR (NOT $\sigma_H$ AND $\chi_V)$
$CX_x = \chi$ XOR SIGN FIG. 7 illustrates a field programmable gate array (FPGA) architecture on which various embodiments of the invention may be implemented. For example, the logic of the word-to-slice sign-magnitude conversion block 102 may be implemented with the configurable logic blocks 602 in the FPGA, and the code-block FIFO 106 may be implemented using block RAM 603 of the FPGA. The logic of the significance lookahead block 108, the parallel context labeling blocks 110a-d, context word encoding block 122, and FIFO 124 may also be implemented using configurable logic resources of the FPGA.

Advanced FPGAs can include several different types of programmable logic blocks in the array. The example FPGA 600 that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607) (e.g., configuration ports and clock ports), and other programmable logic 608 such as digital clock managers, analog-to-digital converters, system monitoring logic, and so forth. Some FPGAs also include dedicated processor blocks (PROC 610).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element (INT 611) also includes the connections to and from the programmable logic element within the same tile, as shown by the examples included at the top of FIG. 7.

For example, a CLB 602 can include a configurable logic element (CLE 612) that can be programmed to implement user logic plus a single programmable interconnect element (INT 611). A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element (INT 611). As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 7) is used for configuration, clock, and other control logic. Horizontal areas 609 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 610 shown in FIG. 7 spans several columns of CLBs and BRAMs.

Note that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear, to facilitate the efficient implementation of user logic.

It will be appreciated that PLDs having different layouts of CLBs, IOBs, and interconnect circuitry (and the functional equivalents thereof) may also implement the various embodiments of the invention described herein. Those skilled in the art will appreciate that various alternative computing or processor or microprocessor arrangements, including one or more processors and a memory arrangement configured with program code, would be suitable for implementing the methods of the present invention. In addition, the processes may be provided via a variety of computer-readable media or delivery channels such as magnetic or optical disks or tapes, electronic storage devices, or as application services over a network.

The present invention is thought to be applicable to a variety of systems for context bit modeling. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A coefficient labeling circuit arrangement for bitplane coding passes in embedded block coding, comprising:
   a significance lookahead circuit configured to generate lookahead significance states of coefficients in past, current, and future magnitude stripe slices of a code-block containing the coefficients; and
   a plurality of context labeling circuits coupled in parallel to the significance lookahead circuit, each context labeling circuit comprising:
      a significance propagation pass circuit,
      a magnitude refinement pass circuit, and
      a cleanup pass circuit;
   wherein each significance propagation pass circuit is configured to generate in parallel respective significance context labels for coefficients in the current magnitude stripe slice responsive to the lookahead significance states,
   wherein each magnitude refinement pass circuit is configured to generate in parallel respective magnitude context labels for coefficients in the current magnitude stripe slice responsive to the lookahead significance states,
   wherein each cleanup pass circuit is configured to generate in parallel respective significance context labels for coefficients in the current magnitude stripe slice responsive to the lookahead significance states, and
   wherein the respective significance propagation pass circuit, respective magnitude refinement pass circuit, and respective cleanup pass circuit in each of the context labeling circuits operate in parallel.

2. The circuit arrangement of claim 1, further comprising a coefficient conversion block coupled to the significance lookahead circuit and configured to input groups of n coefficients of a code-block and generate for each group of n coefficients an output word that contains the n coefficients, wherein n is greater than 1, and the output word is formatted with bits of the n coefficients in the same bitplane being consecutive in the output word.

3. The circuit arrangement of claim 2, further comprising a code-block memory coupled to the significance lookahead circuit and to the coefficient conversion block, wherein the code-block memory is dual ported with a first port for writing of an output word by the coefficient conversion block and a second port for reading of a magnitude stripe slice by the significance lookahead circuit.

4. The circuit arrangement of claim 3, wherein the coefficient conversion block addresses the code-block memory with one set of address bits per output word written to the code-block memory.

5. The circuit arrangement of claim 4, wherein the significance lookahead circuit addresses the code-block memory with one set of address bits per magnitude stripe slice read from the code-block memory.

6. The circuit arrangement of claim 5, wherein the coefficient conversion block is further configured to generate and output a sign word for each group of n coefficients of a code-block, wherein each bit in the sign word has a value representing a sign of a corresponding one of the n coefficients.

7. The circuit arrangement of claim 6, further comprising a sign memory coupled to the significance lookahead circuit and to the coefficient conversion block, wherein the sign memory is dual ported with a first port for writing of a sign word by the coefficient conversion block and a second port for reading of a sign word for the plurality of context labeling circuits.

8. The circuit arrangement of claim 2, wherein the coefficient conversion block is further configured to generate and output a sign word for each group of n coefficients of a code-block, wherein each bit in the sign word has a value representing a sign of a corresponding one of the n coefficients.

9. The circuit arrangement of claim 8, further comprising a sign memory coupled to the significance lookahead circuit and to the coefficient conversion block, wherein the sign memory is dual ported with a first port for writing of a sign word by the coefficient conversion block and a second port for reading of a sign word for the plurality of context labeling circuits.

10. The circuit arrangement of claim 1, wherein the lookahead significance states of coefficients in past, current, and future magnitude stripe slices generated by the significance lookahead circuit include a lookahead significance stripe slice of the clean-up pass applied to the current stripe slice.

11. The circuit arrangement of claim 10, wherein the lookahead significance states of coefficients in past, current, and future magnitude stripe slices generated by the significance lookahead circuit include a lookahead significance stripe slice of the clean-up pass applied to the past stripe slice.

12. The circuit arrangement of claim 11, wherein the lookahead significance states of coefficients in past, current, and future magnitude stripe slices generated by the significance lookahead circuit include a lookahead significance stripe slice of the significance propagation pass applied to the current stripe slice.

13. The circuit arrangement of claim 12, wherein the lookahead significance states of coefficients in past, current, and future magnitude stripe slices generated by the significance lookahead circuit include a lookahead significance stripe slice of the significance propagation pass applied to the future stripe slice.

14. A method for coefficient labeling for bitplane coding passes in embedded block coding, comprising:
   generating, using a processor, lookahead significance states of coefficients in past, current, and future magnitude stripe slices of a code-block containing a plurality of coefficients;
   generating in parallel within a significance propagation pass, respective significance context labels for coefficients in the current magnitude stripe slice responsive to the lookahead significance states;
   generating in parallel within a magnitude refinement pass, respective magnitude context labels for coefficients in the current magnitude stripe slice responsive to the lookahead significance states; and
   generating in parallel within a cleanup pass, respective significance context labels for coefficients in the current magnitude stripe slice responsive to the lookahead significance states;
   wherein the generating of context labels by the significance propagation pass, magnitude refinement pass, and cleanup pass are performed in parallel.

15. The method of claim 14, wherein the lookahead significance states of coefficients in past, current, and future magnitude stripe slices include a lookahead significance stripe slice of the clean-up pass applied to the current stripe slice.

16. The method of claim 15, wherein the lookahead significance states of coefficients in past, current, and future magnitude stripe slices include a lookahead significance stripe slice of the clean-up pass applied to the past stripe slice.

17. The method of claim 16, wherein the lookahead significance states include a lookahead significance stripe slice of the significance propagation pass applied to the current stripe slice and a lookahead significance stripe slice of the significance propagation pass applied to the future stripe slice.

18. The method of claim 17, wherein the lookahead significance states of coefficients in past, current, and future magnitude stripe slices include a lookahead significance stripe slice of the significance propagation pass applied to the future stripe slice.

19. The method of claim 14, further comprising:
inputting input groups of n coefficients of a code-block; and
generating for each group of n coefficients an output word that contains the n coefficients, wherein n is greater than 1, and the output word is formatted with bits of the n coefficients in the same bitplane being consecutive in the output word.

20. An apparatus for coefficient labeling for bitplane coding passes in embedded block coding, comprising:
a non-transitory processor readable storage device configured with program code that when executed by one or more processors causes the processors to perform the operations including:
generating lookahead significance states of coefficients in past, current, and future magnitude stripe slices of a code-block containing a plurality of coefficients;
generating in parallel within a significance propagation pass, respective significance context labels for coefficients in the current magnitude stripe slice responsive to the lookahead significance states;
generating in parallel within a magnitude refinement pass, respective magnitude context labels for coefficients in the current magnitude stripe slice responsive to the lookahead significance states; and
generating in parallel within a cleanup pass, respective significance context labels for coefficients in the current magnitude stripe slice responsive to the lookahead significance states;
wherein the generating of context labels by the significance propagation pass, magnitude refinement pass, and cleanup pass are performed in parallel.

* * * * *